July 28, 1959    A. FREEMAN ET AL    2,896,769
PROFILE READER AND CONVEYOR SYSTEMS
Filed Sept. 14, 1956    6 Sheets-Sheet 1

July 28, 1959　　A. FREEMAN ET AL　　2,896,769
PROFILE READER AND CONVEYOR SYSTEMS
Filed Sept. 14, 1956　　6 Sheets-Sheet 2

July 28, 1959     A. FREEMAN ET AL     2,896,769
PROFILE READER AND CONVEYOR SYSTEMS
Filed Sept. 14, 1956     6 Sheets-Sheet 4
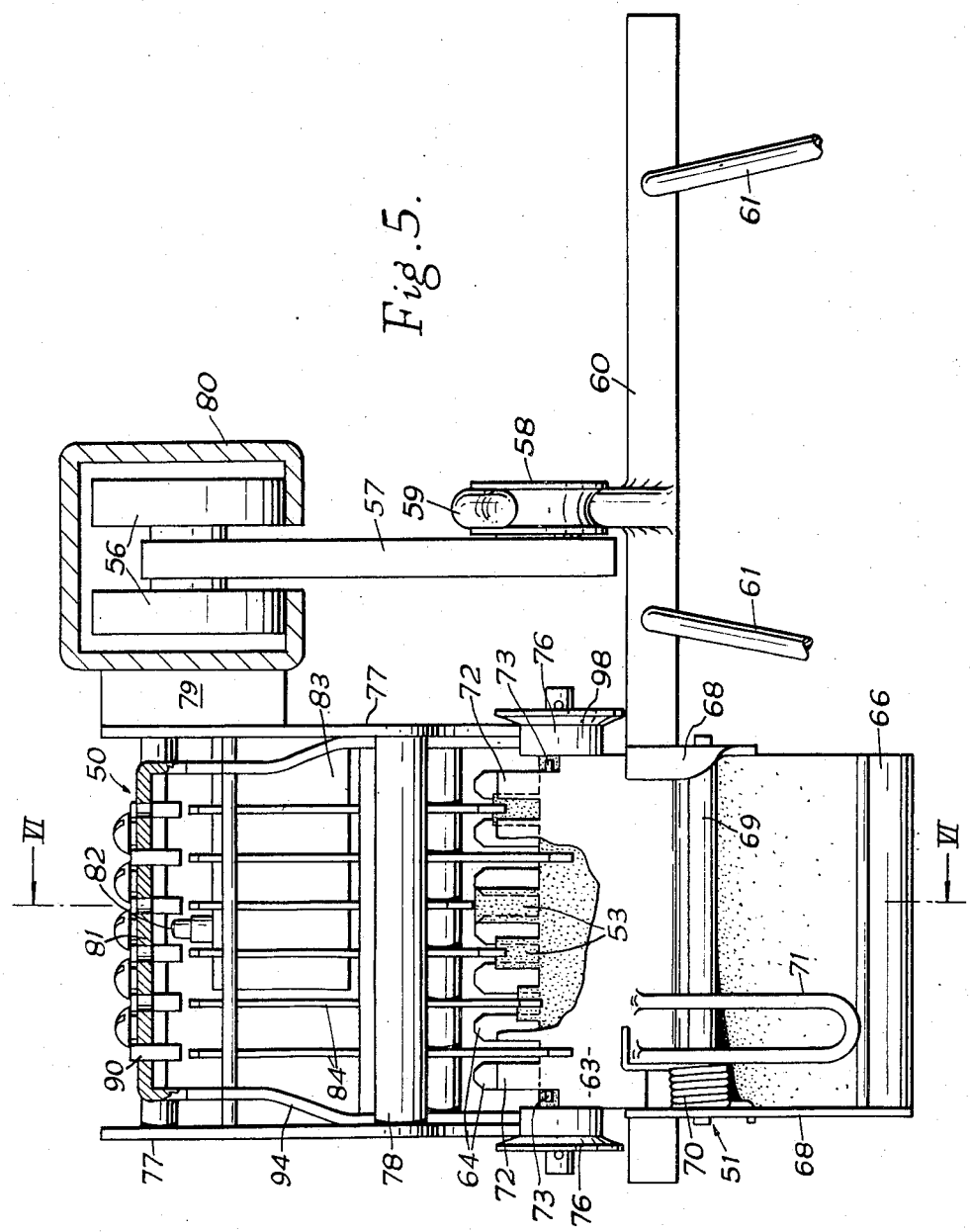

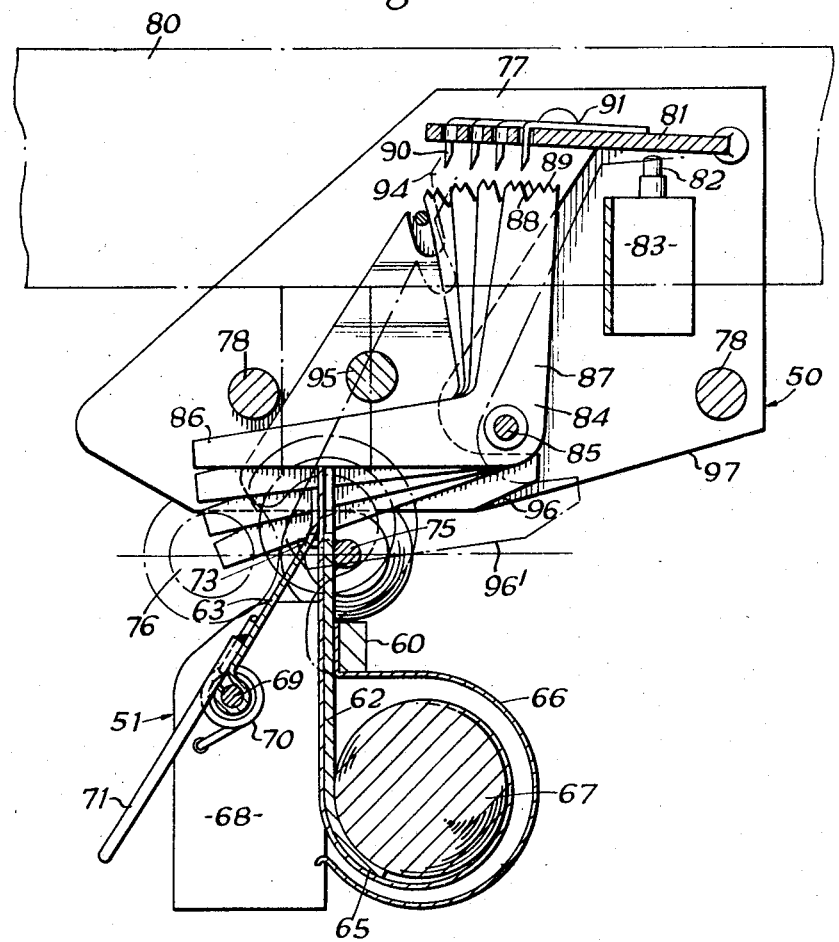

July 28, 1959  A. FREEMAN ET AL  2,896,769
PROFILE READER AND CONVEYOR SYSTEMS
Filed Sept. 14, 1956  6 Sheets-Sheet 6
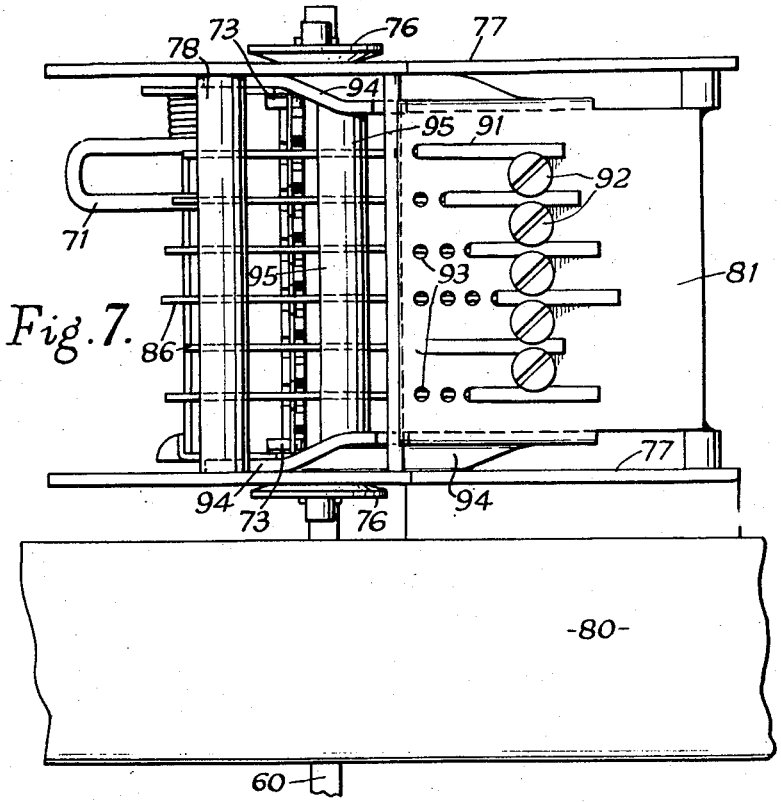
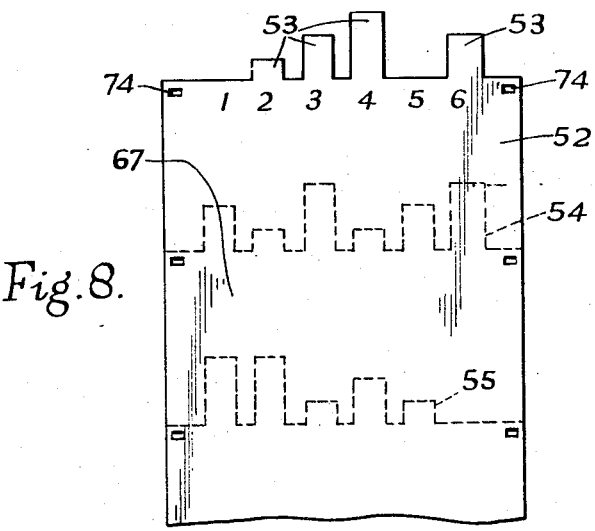

United States Patent Office 2,896,769
Patented July 28, 1959

2,896,769
PROFILE READER AND CONVEYOR SYSTEMS

Alfred Freeman and Doris Rachel Freeman, both of Isham, near Kettering, England

Application September 14, 1956, Serial No. 609,946

Claims priority, application Great Britain February 7, 1955

5 Claims. (Cl. 198—38)

This invention is concerned with a profile-reading mechanism which is disposed at a fixed location and senses the profile of passing bodies or structures, the mechanism being devised or set so that when a particular, pre-arranged profile passes it reacts to operate a trip means for various possible purposes.

Such an arrangement has numerous applications. Thus, for example, it may be used for the direct testing of workpiece profiles, the trip means being used to operate a mechanism for rejecting those workpieces which do not conform with a standard shape. Another use is the testing of articles for size and shape to enable them to be automatically sorted.

A further and advantageous application, to which the ensuing specification and claims will be confined for convenience and which will hereinafter be referred to as "a conveyor system of the character set forth" is to a system in which goods (e.g. work) are transported in or on holders on a conveyor along a circuit having profile-reading mechanisms at stations along this circuit, the goods, batches of goods, or holders each having a profiled structure associated therewith and adapted to select the appropriate next station at which the goods concerned are to be discharged or operated on.

The profile-reading mechanism as set forth above which forms the subject of the present invention comprises a plurality of feeler members which, in use, are positioned for contact with related parts of a passing profiled structure and for individual rotation, where such contact takes place and as a result of the latter, by respective amounts determined by the dimensions of these related parts of the profile, and a trip-operating means which is permitted, in response to the rotation of said feeler members by predetermined respective amounts, to move and operate trip means associated with said mechanism.

The feeler members can take various forms, for example be strips, fingers, or discs, and be mounted to rotate or pivot about a vertical, horizontal or other axis.

Thus, in one embodiment, the feeler members are in the form of spaced discs or equivalent (hereinafter generically referred to as discs) each having a contact edge or surface which, in use, is presented in the general path of travel of the profiled structure and is adapted, at least in those cases where the lateral dimension of the corresponding parts of the structure permits contact with the disc, to be carried along by said part for a distance corresponding to the lateral dimension of this part, whereby some or all of the discs are rotated respective amounts determined by the profile of said structure.

The profiled structure, which will preferably move past the reading mechanism in a direction tangential to an imaginary circle about the common axes of rotation of the discs as centre, will in so doing ride along the said edges or surfaces, whereby the travel (preferably rectilinear) of the various parts of the structure whilst in contact with these edges or surfaces will be translated into rotations of the individual feeler members. The degree of rotary movement can therefore be determined by judicious selection of the effective lengths of the feeler edges or surfaces of these members and can, in this way, be made as large as is convenient thereby to make the device sensitive to even small variations in the profile.

In another embodiment of the mechanism according to this invention, as applied to a conveyor system of the character set forth, the feeler members comprise pivoted levers adapted to wipe over the effective parts of the profiled structure and to be thereby rotated the said respective amounts, and the trip-operating means comprises a pivotally-mounted member which is rockable, when these feeler levers are rotated in accordance with a predetermined combination, to operate the trip means.

The trip means may take various forms, e.g. comprise a switch controlling an electro-magnetic triggering device, a catch which is movable with the plate, bar or the like into the path of a goods holder to be discharged from the conveyor, and so on.

The selector device advantageously comprises a holder which carries and supports a selector member in the form of a card so as to bring a characteristic profiled edge of this card into contact with a set of feeler elements of each reader whereby, when the feeler elements of any particular reader detect a card edge of a predetermined contour in a passing selector device, they will respond to operate the associated trip means.

The term "card" used above and hereinafter in the specification and claims is intended to include a member which may or may not be of cardboard, but is flexible or semi-flexible as a sheet of thin cardboard. Thus, for instance, pasteboard, thick paper, or even thin metallic sheet will fall within this definition.

Embodiments of the invention are illustrated in the accompanying drawings in which Figure 1 is a side view of a form of testing or reading mechanism in accordance with one embodiment of this invention, which is disposed in a conveyor system of the character set forth.

Figure 5 is an end view of a second embodiment of the invention, again illustrated in use in a conveyor system of the character set forth.

Figure 6 is a cross section on the line VI—VI of Figure 5.

Figure 7 is a plan view of the assembly of Figures 5 and 6 and

Figure 8 illustrates a form of profiled card which may be used in the system described in connection with Figures 5, 6 and 7.

Figure 1:
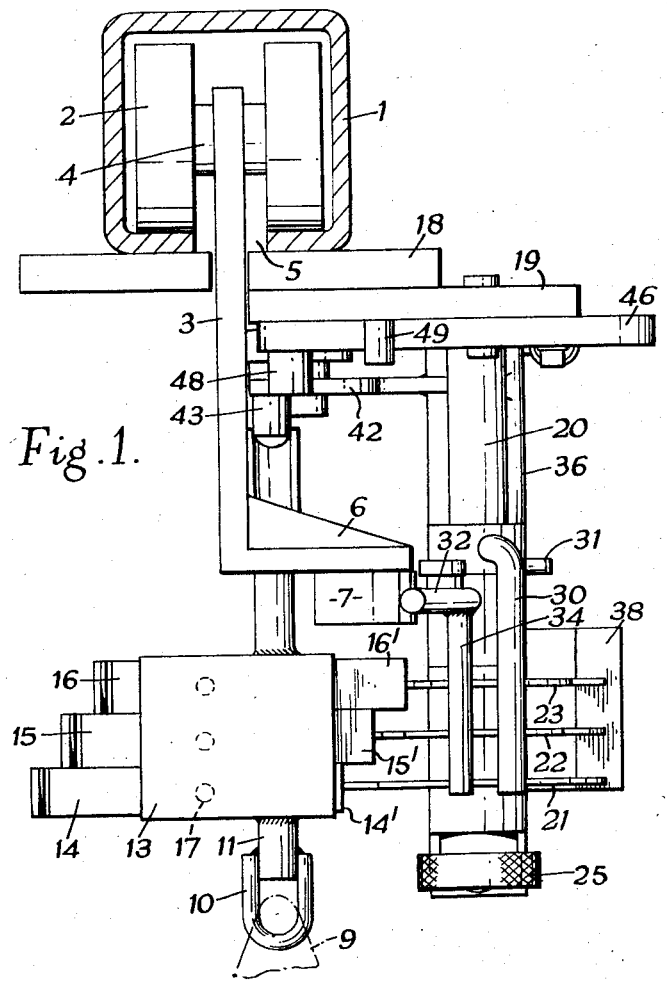

Referring first to Figures 1 to 4, the conveyor system is shown as comprising a tubular casing 1 having running therein and secured to a conveyor chain (not shown) in this casing 1, a pair of wheels 2 having a plate 3 mounted on the common spindle 4 of the wheels 2 and passing through a slot 5 in the bottom of the casing. At its lower end the plate 3 has an angled arm 6 in which is pivotally mounted a roller 7.

The plate also carries thereon a lateral pulley 8 intended for suspension of a workholder from this plate, i.e. from the conveyor. This workholder, which is schematically indicated at 9 in Figure 1, is mounted on a loop 10 secured to the lower end of stem 11 which is hooked at 12 at its upper end, whereby the holder is suspended in use from this pulley. The stem has secured thereto a pocketed holder 13 forming part of a selector structure which also includes selector strips (in this case three) 14, 15 and 16 which are slidable in this holder and cooperate with spring pressed balls 17 in the latter, so as each to be retained in one of three alternative adjusted positions. In the case illustrated in the drawings, each of the three strips is in one of the three alternative positions, whereby the noses 14', 15' and 16' of these strips are projected different amounts laterally of the holder 13.

The testing or reading mechanism proper is carried by a plate 18 secured to the underside of the casing 1 and also slotted for the passage of the plate 3, this plate 18 carrying, through a second plate 19 secured to its underside, a depending spindle 20 on which are loosely threaded three feeler members in the form of discs 21, 22 and 23 positioned for co-operation respectively with the noses of the selector strips 14, 15 and 16. The discs 21, 22 and 23 are maintained in appropriate position by sleeves 24 and are retained at the underside of the spindle 20 by a knurled nut 25.

Figure 4:
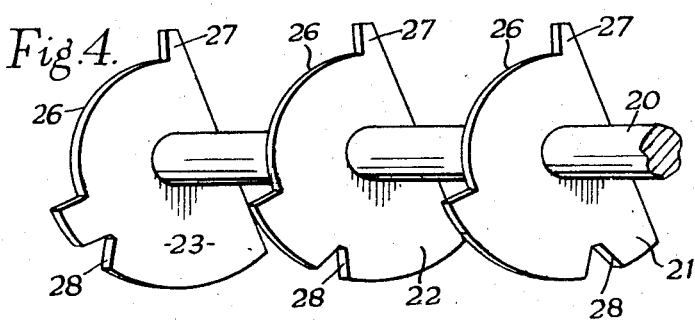
Figure 4 is a perspective illustration of part of the mechanism used in Figures 1 to 3.
Figure 2:
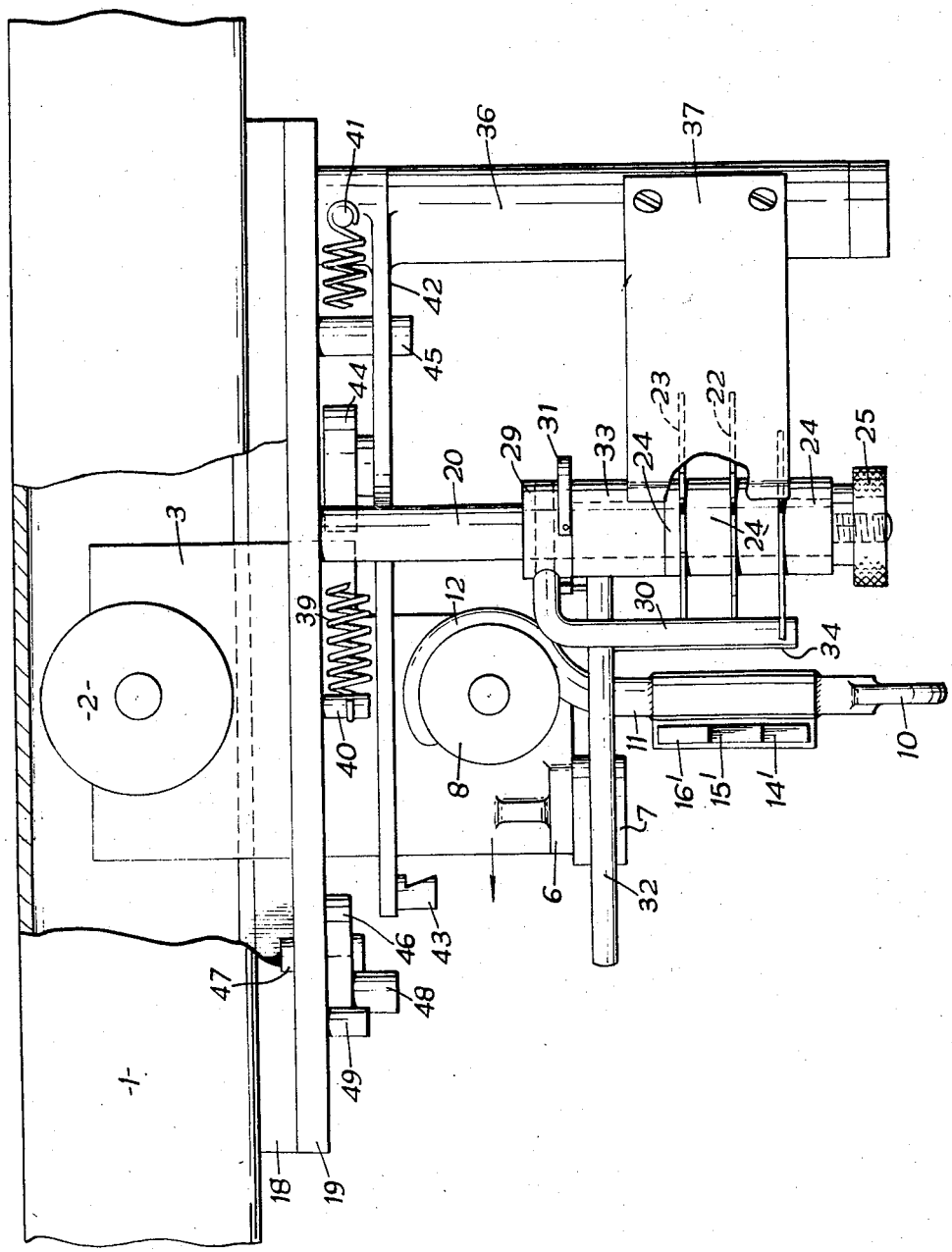
Figure 2 is a rear view corresponding to Figure 1.
Figure 3:
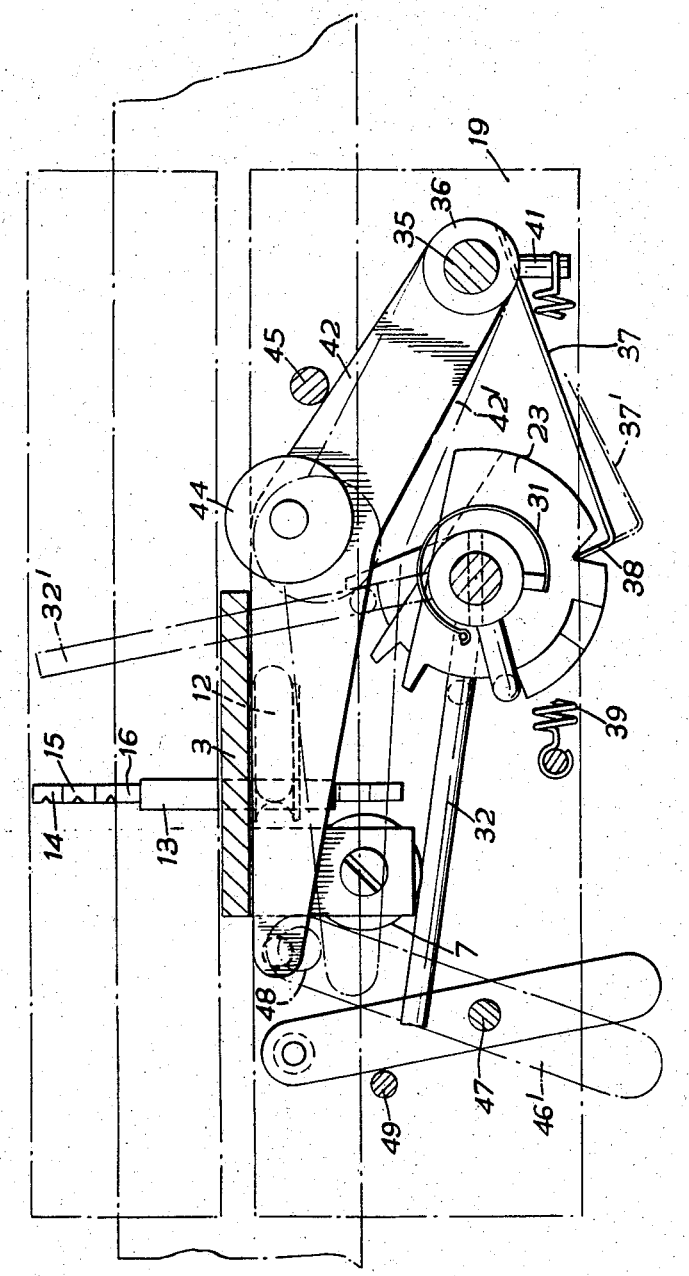
Figure 3 is a plan view, partly in horizontal section, of the same assembly.

The form of the discs 21, 22 and 23 is seen more clearly from Figure 4 of the drawings, in which they are shown loosely threaded on the spindle 20, with the spacing and mounting sleeves 24 removed. Thus, it will be seen that each disc is generally of slightly more than semi-spherical form, being in fact a part of a circle from which a segment has been removed and having an aperture disposed at the centre of the imaginary circle for threading on the spindle 20. Further, each of these discs has an arcuate peripheral recess 26 which is of the same arcuate length in the case of all three discs and commences a short distance from the leading end of the arcuate edge of the disc, so as to leave the discs with equally-dimensioned noses 27. In addition each of the discs 21, 22 and 23 is provided with a V-shaped notch 28 intermediate the recess 26 and the trailing end of the arcuate edge of the disc, these notches being at different circumferential distances from the nose 27 of the disc concerned, depending on the degree of projection of the corresponding profiled part, i.e. the corresponding selector strip, which is to be approved by this disc, as will be hereinafter explained.

The spindle 20 has keyed thereon a fixed collar 29 from which extends a depending arm 30 passing through the recess 26 in the respective discs. This sleeve 29 also has anchored thereto one end of a torsion spring 31 which, at its other end, is connected to a lever arm 32, which is secured to a sleeve 33 rotatable on the spindle 20, and has a depending arm 34 which also passes through the recess 26 in the discs 21, 22 and 23.

A second spindle 35 depends from the plate 19 and has a sleeve 36 disposed around it this having screwed to its lower end a plate 37 representing the trip-operating member referred to above. This plate has a cranked end 38 co-operating wtih the feeler discs 21, 22 and 23, as will be hereinafter explained. A tension spring 39 is anchored at one end to a pin 40 on the plate 19, and at its other end to a pin 41 on the sleeve 36.

This sleeve further carries a lever 42 which is of elbowed form and is provided at its outer end with a catch 43 for cooperation with the hook 12 of passing workholders, as will be hereinafter explained. The lever 42 is also provided with a depending roller 44, the purpose of which will also be subsequently referred to, and a stop pin 45 is provided on the underside of plate 19 to limit the movement of this lever.

In addition, a latch bar 46 is pivoted at 47 from the underside of the plate 19 and carries at its end a stud 48 for cooperation with the outer end of the lever 42. A stop pin 49 is also provided on plate 19 to limit the range of movement of the latch bar 46.

This mechanism operates as follows:

As the workholder concerned passes the reader mechanism, the selector noses 14', 15' and 16' respectively engage the leading face or edge of the discs 21, 22 and 23 and ride over these edges, which are straight and, before contact with the selector strips, aligned and with a period of contact depending on the relative degrees of projection of these strips 14, 15 and 16. In the case illustrated, the nose 16' projects to the greatest extent, so that the upper disc 23 will be in contact with the nose 16' for a longer a period than in the case of the other two, and, in consequence, the disc 23 will be turned through a correspondingly greater angle than the other two discs. Disc 22 will be rotated to a lesser degree, but more than the disc 21. The positioning of the notches 28 in these respective discs is, however, such that these notches will be brought into vertical alignment at the moment the nose 16' is about to leave the disc 23, and at this moment the roller 44, which hitherto has been running over the plate 3, to maintain the lever 42 in the dotted position 42', and the plate 37 in the position 37' (see Figure 3), is freed from this plate, so that the tension spring 39 can turn the sleeve 36 and the cranked end 38 of the plate will enter the aligned notches 28 in the discs. As a result the lever 42 is swung into the full line position indicated in Figure 3, bringing its catch 43 into the line of approach of the end of hook 12, so that, as the latter passes, it is pushed around and over the pulley 8, thereby rejecting the workholder 9 and the goods carried thereby.

In the above description of the operation, it has been indicated that, in the particular instance chosen, the discs are formed to accept the particular profile combination exhibited by the selector structure 13. Where, however, this is not the case, then the rotation of the discs 21, 22 and 23 will not bring their notches 28 into alignment, so that the plate end 38 will not be able to enter them and the lever arm will remain in the dotted position 42', i.e. with its catch 43 out of range of the hook 12, so that the goods carrier will pass the reader mechanism unmolested.

During its passage past the reader mechanism, the roller 7 on the plate 3 runs along the arm 32 thereby turning the arm portion 34 anti-clockwise in the disc recesses 26 (as viewed in Figure 3) this enabling the rotation of the discs to take place without obstruction. When, however, the roller 7 finally runs off the arm 32, then the torsion spring 31 turns the latter clockwise, so that the arm portion 34 abuts against the leading edges of the recesses 26 in the various discs and knocks these round into their initial position again, i.e. with their noses 27 vertically aligned, the final position being determined by abutment of the trailing edges of these recesses with the depending arm 30.

Finally, where the station concerned is full, or for some other reason it is desired not to accept any more goods at this place, the latch bar 46 is turned into the dotted position 46' (see Figure 3) for example by the accumulated goods themselves, so that the stud 48 positively precludes the lever 42 from swinging out of the dotted position 42' and thereby detaching the passing goods, even where the selector structure 13 concerned has a favourable setting.

Although the mechanism described in connection with Figures 1 to 4 is capable of many modifications within the ambit of this invention, two particular variations only will be specifically referred to here, since these introduce features of particular value. They are both concerned with the feeler discs.

In accordance with the first of these features, one of the feeler discs may be furnished with a number of notches around the periphery for receiving the trip-operating member, these notches being of different depths. Thus, with the notches in the other discs vertically aligned (i.e. with the remaining part of the profiled body or selector structure exhibiting an approved shape) more than one profile or selector projection will bring a notch on the remaining disc 1 into alignment and allow the trip-operating member to move in. The different possible distances of resultant travel of this member may be arranged to operate different corresponding trip means.

As an example, the disc 21 in Figure 4 may have two additional peripheral notches which are of different radial depths from one another and from the V-notch 28. There are consequently three radial positions of the disc 21 (i.e. three different settings of selector finger 16) which will allow the member 37, 38 to turn, assuming the other discs 22 and 23 are correctly orientated.

The arm 27 may then, for example, cooperate with a set of three micro-switches arranged in cascade, i.e. so as to be triggered in turn according to the degree of travel of the arm 37. These microswitches may control different goods-discharging devices.

Thus, for instance, one testing or reading mechanism equipped with a number (two, three or more) of discharge chutes to different localities may be used to take off the conveyor all the goods of a particular characteristic, e.g. a particular shape, and simultaneously sort these into sub-classifications, e.g. of size.

This feature therefore provides an economy of testing or reading mechanisms in a conveyor circuit, in that some, at any rate, of the functions of a group of such mechanisms are combined in a single apparatus.

The second modification referred to above is concerned with the position of the noses 27 relatively to the axis of spindle 20. As will be understood, the amount of rotation of the feeler discs will vary with the distance between the point contact of the passing selector strip (or equivalent profile element) from this spindle axis. Consequently, by having this distance set to suit the different profile or selector strip projections, the arcuate movement of the various discs will, in the case of an acceptable combination, be substantial, e.g. the same.

This not only increases the testing sensitivity of the mechanism but also means that the number of profiled body/feeler disc contacts will be reduced—a particular advantage when a wearable or more delicate profiled or indicator body, e.g. a profiled card, is used as or in the selector device.

The form of the invention illustrated in Figures 5 to 8 is again intended for use in a conveyor system of the character set forth. In this case, for example, the system concerned will be assumed to be applied to the closing room in a boot and shoe manufactory, and to be such that it enables each batch of work to be ejected from the conveyor at any pre-selected machine where, after being dealt with by the operative concerned, it is reloaded on the conveyor and routed to the next appropriate machine for ejection, and so on. A profile testing or reader mechanism is arranged at each ejection point and is set to correspond with a particular profile exhibited by holders passing with the work.

In the particular example illustrated in Figures 5 to 8, the testing or reader mechanism is generally indicated at 50 and an example of the co-operating profiled selector structure at 51. This selector device is associated with a work holder and carries, in effect, a series of profiled members which are brought in turn into effective positions to determine the successive destinations of the work, i.e. from one selected reader mechanism to another, along the conveyor circuit.

In this form of the invention, profiled cards are used as the profiled members in the selector structure, each card having, along its active edge, a total of six effective parts, i.e. having a possible maximum of six upstanding, spaced teeth, these latter being in this instance of rectangular shape. Further, each tooth can have one of three possible heights, meaning that, together with the zero height or "no tooth" situation, there are four possible effective heights per effective section of the profiled edge of each card.

The upper part of Figure 8 illustrates a form of card 52 of this character, in which it will be seen that the card 52 has teeth 53 at the effective sections. As will also be seen from this figure, the teeth at the sections 2, 3 and 4 are of different heights, those at sections 1 and 5 are of "zero" height, and that at section 6 is of the same height as that at section 3.

Moreover, a series of cards is provided for successive use with the selector structure, these cards being combined in a roll 67 which is perforated or otherwise formed transversely of its length with successive profile shapes or embryo teeth, such that a new effective profile shape can be exposed at any time by tearing along the next line of perforations or equivalent. This arrangement is also illustrated in Figure 8, in which lines of perforations 54 and 55 defining succeeding profile shapes are indicated on the roll 67 of which the card 52 forms the leading end.

Hence, in using this arrangement in the conveyor system, the operative can tear off the effective card 52 by means of which a particular batch of work was directed to his location along the conveyor route and move the roll of cards up in the selector structure, so that the next succeeding card, with its profile 54 exposed by the tearing action, is brought into the effective position in the structure (as will be explained below), and so dispatch the batch of work onwards to the next required location. The card 52 which he has detached can then be used as a work ticket or for other purposes, and it will be appreciated that the roll of cards originally dispatched with the work from the starting point can represent the complete travel of the work throughout the part of the factory served by the conveyor system.

Each selector structure is associated with a work holder which is mounted on the conveyor as illustrated by way of example in Figure 5 of the drawings. The conveyor here is shown as incorporating pairs of rollers 56 running in a tubular casing 80 and having an arm 57 suspended from the spindle of these rollers and carrying at its lower end a pulley 58 which receives a mounting hook 59 of the work holder. This hook, in fact, is attached to a bar 60 from which the work holder (not shown) is suspended by arms 61.

Each selector structure or device 51 includes a backing plate 62 which is secured to the bar 60, and a spring clip 63, the operative profiled card being secured between the backing plate 62 and clip 63. At its upper edge this plate 62 has a set of seven upstanding teeth 64 of equal height, and at its lower end 65 is curved.

Secured between the bar 60 and the backing plate 62 is a sheet metal scroll 66 which overlaps the curved lower end 65 of the plate and serves as a housing for the roll of cards 67. With the roll 67 disposed as illustrated in Figure 6 of the drawings, the leading end is passed up over the backing plate and the profiled leading edge of the roll of cards, i.e. the effective profiled edge, is applied against the teeth 64 of the backing plate as seen in Figure 5, being held in this position by the clip 63.

Attached to, or integral with, the sides of the backing plate 62 are opposed wings 68 supporting between them a pin 69 on which the clip 63 is pivotally mounted, the marginal upper edge of this clip being resiliently urged by a torsion spring 70, disposed around the pin 69, against the upper part of the backing plate. The clip 63 is provided with a loop-form thumbpiece 71 to enable it to be pivoted, and its marginal upper part, which is inclined relatively to the main body of the clip, is recessed to form seven equal sized teeth 72, which are shorter than, but in lateral register with, the teeth 64 of the backing plate.

Thus, when the leading end of the roll of cards is to be set in effective position, the clip 63 is swung back by pressing on the thumbpiece 71 and the leading end of the roll positioned by impaling the edges of the card on lugs 73 which are provided on the backing plate for this purpose, these lugs entering holes 74 provided in the card for this purpose adjacent each profiled edge. When the profiled edge of the card is in position, the effective projections or teeth of this edge lie astride the gaps between the teeth of the clip and of the backing plate, as seen in Figure 5. Moreover, the teeth 53 of the card are dimensioned so as to overlap these gaps widthwise, so that the card will not only be held between the clip 63 and the backing plate 62 across its whole width immediately below the roots of the teeth in the card, with these teeth 53 exposed at the required heights in the said gaps, but also with the side edges of the teeth 53 gripped and sustained between the teeth 64 and 72 of the backing plate and clip respectively.

The backing plate is, furthermore, provided with a bar 75 across its rear face, this having loosely mounted on its end parts flanged rollers 76 for the purpose of correctly locating the selector structure and the profiled effective edge thereof in relation to the testing or reading mechanism, and also for the purpose of relieving the load on the feeler members of this mechanism during the "sensing" operation, as will be hereinafter described.

The reader mechanism 50 comprises a frame composed of a pair of side cheeks 77 which are connected by transverse bolts 78 and are supported by a pivoted arm 79 from the conveyor casing 80. Pivoted at its ends in the side cheeks 77 is a trip operating member 81 in the form of a plate, this cooperating with the plunger 82 of a micro-switch 83 which is also fixedly supported between the plates 77. This switch controls a solenoid (not shown) for operating trip means to eject the work traveling with any selector structure with a profile which is acceptable to the reader mechanism concerned. This trip means may, in fact, be a catch (again not shown) which is adapted, when operated, to be lowered into the path of the leading end of the hook 59, thereby to force this hook over the pulley 58 and to eject the work holder and selector structure carried thereby.

The plate 81 is mounted over and astride the path of the oncoming selector structures and disposed below this plate 81 are six like feeler levers 84 of bellcrank form which are loosely mounted on a common spindle 85 between the side cheeks 77 and each in a position registering with a gap between the teeth 64 and 72 of the selector structure. The lower arms 86 of the various levers 84 are relatively long and light, being tapered towards their outer ends, and are of a width which enables them to be received in the gaps referred to above and thereby to wipe over the effective profile parts or teeth of the card carried by successive selector structures as they travel through the reader mechanism.

The upper arm 87 of each lever 84 is provided centrally at its outer end with a recess 88 which is flanked by teeth 89 of smaller depth, and the purpose of which will be hereinafter referred to. It will be noted from the drawings that these upper arms are disposed more or less vertically, so that they do not add materially to the weight to be lifted by the selector cards during the sensing action.

The pivoted reader plate 81 is equipped, at six places across its width corresponding to the six gaps or effective profile sections in the selector structure, with projections 90 which thus are in register with the various feeler arms 87 (see Figure 5). These projections are tapered at their lower ends and are formed by downturned parts of metal strips 91 which are variably positioned on the upper side of the plate 81, being held in the selected position by screws 92. Since the system here concerned allows for four possible heights of the effective sections of the profiled edge of the selector card, meaning that each of the feeler levers 84 may take up one of four angular positions as a result of its wiping over the corresponding part of the profiled edge during the travel of the selector structure through the reader mechanism, provision is made for setting the projections 90 to one of four possible positions longitudinally of the plate 81 (i.e. in the direction of travel of the selector structures relatively thereto). This provision is provided by four appropriately-positioned holes 93 in the pivoted plate 81 (see Figure 7).

The arrangement then is that, when, and only when, the levers 84 are swung by the teeth 53 of the card through the respective angles conforming to the combination acceptable to this reader mechanism, the projections 90 will each come into register with the central notch 88 in the corresponding finger arms 87 thus allowing the plate 81 to rock relatively to the side plates 77 and so operate the microswitch 83 to bring about the tripping action. At other times, one or more of the projections 90 will, instead, lodge in one of the teeth 89 in the corresponding arm 87, this preventing the plate 81 from pivoting to operate the microswitch whilst, at the same time, the engagement of the projection 90 with the teeth 89 concerned will act as a detent to prevent any chance of the projection accidentally slipping on the upper edge of the arm 87 and into the notch 88 and to hold up the feeler lever concerned.

The reader plate 81 also has secured thereto a pair of depending side plates 94 which are located within, and alongside, the side cheeks 77, and are connected by a transverse bar 95. The lower edges 96 of the side plates 94 protrude slightly below the related parts of the lower edges 97, i.e. are normally in the position indicated in dotted lines at 96' in Figure 6. When a selector structure is passing through the mechanism, however, these lower edges 96 are engaged by the inner hubs 98 of the rollers 76 of the selector structure, thereby lifting the side plates 94 into the position shown in full lines in Figure 6, and thus raising the reader plate 81 into an out of the way position, so that the "sensing" action of the lever arms 86 can take place without obstruction by the projections 90 on this plate 81. When the rollers 76 have left the bottom edge of the side plates, the plate 81 is allowed to drop either into a position in which it carries out a full pivoting movement and all the projections 90 thereon drop into the corresponding recesses 98, or through a half rotation in which one or more of the projections engage in corresponding teeth 89 and thus prevent the full fall of the plate and thereby preventing operation of the tripping microswitch 83.

It is to be appreciated that the effective parts of the profiled edge of the card, i.e. those parts thereof arranged for contact with the respective feeler elements of the readers, may be joined directly and continuously each to the next, or may be separated by gaps or recesses at the non-effective parts of the edge as shown.

It is also to be understood that the possible effective profiled edge contours can include a straight edge, and one in which all the teeth are of the same height.

What we claim then is:

1. A profile-reading mechanism as set forth, comprising a support, a spindle on said support, a plurality of feeler discs spaced along said spindle and individually pivotable on this spindle, each said disc having a contact edge for sliding engagement by part of a passing profile, and having a recess therein spaced from this contact edge, a trip-operating member pivotally mounted on said support and having a marginal part movable into the recesses in the feeler discs when all these recesses are brought into alignment by rotation of the discs predetermined individual amounts corresponding to an approved passing profile, spring means urging said trip-operating member in a direction to engage said marginal part thereof in said recesses, and a trip device operable by said trip-operating member.

2. A profile-reading mechanism as set forth, comprising a support, a spindle on said support, a plurality of feeler discs spaced along said spindle and individually pivotable on this spindle, each said disc having a contact edge for sliding engagement by part of a passing profile, and having a recess therein spaced from this contact edge, one of said discs having a plurality of such recesses of different depths along an edge thereof, a trip-operating member pivotally mounted on said support and having a marginal part movable into the recesses in the feeler discs when all these recesses are brought into alignment by rotation of the discs predetermined individual amounts corresponding to an approved passing profile, spring means urging said trip-operating member in a direction to engage said marginal part thereof in said recesses, a plurality of trip devices selectively operable by said trip device in accordance with the degree of pivoting thereof permitted by the depth of the particular recess which it enters in said disc having a plurality of recesses.

3. A profile-reading mechanism as set forth, comprising a support, a spindle on said support, a plurality of feeler discs spaced along said spindle and individually pivotable on this spindle, each said disc having a contact edge for sliding engagement by part of a passing profile, and having a recess therein spaced from this contact edge and the contact edges of said discs being disposed at variable distances from the axis of said spindle, a trip-operating member pivotally mounted on said support and having a marginal part movable into the recesses in the feeler discs when all these recesses are brought into alignment by rotation of the discs predetermined individual amounts corresponding to an approved passing profile, spring means urging said trip-operating member in a direction to engage said marginal part thereof in said recesses and a trip device operable by said trip-operating member.

4. A mechanism as claimed in claim 1, further including a spring-urged arm for zeroising the feeler discs operated by a passing profile.

5. A profile-reading mechanism as set forth, comprising a support, a spindle on said support, a plurality of feeler discs spaced along said spindle and individually pivotable on this spindle, each said disc having a contact edge for sliding engagement by part of a passing profile, and having a recess therein spaced from this contact edge, a trip-operating member pivotally mounted on said support and having a marginal part movable into the recesses in the feeler discs when all these recesses are brought into alignment by rotation of the discs predetermined individual amounts corresponding to an approved passing profile, spring means urging said trip-operating member in a direction to engage said marginal part thereof in said recesses, a trip lever pivotally mounted on said support and carrying a catch and adapted to be pivoted by said trip-operating member to bring this catch into an operative position and a latching device operable to hold said lever positively in the catch-inoperative position.

References Cited in the file of this patent

UNITED STATES PATENTS

| | | |
|---|---|---|
| 2,661,828 | Vogt | Dec. 8, 1953 |
| 2,667,260 | Pyles | Jan. 26, 1954 |
| 2,755,908 | Freeman | July 24, 1956 |
| 2,757,781 | Freeman | Aug. 7, 1956 |
| 2,758,698 | Freeman | Aug. 14, 1956 |
| 2,796,968 | Burrows | June 25, 1957 |